March 15, 1949.  N. ORSINI  2,464,709
PUSHCART
Filed Nov. 20, 1946  3 Sheets-Sheet 1

INVENTOR.
Nello Orsini,
BY Victor J. Evans & Co.
ATTORNEYS

March 15, 1949.  N. ORSINI  2,464,709
PUSHCART
Filed Nov. 20, 1946  3 Sheets-Sheet 2
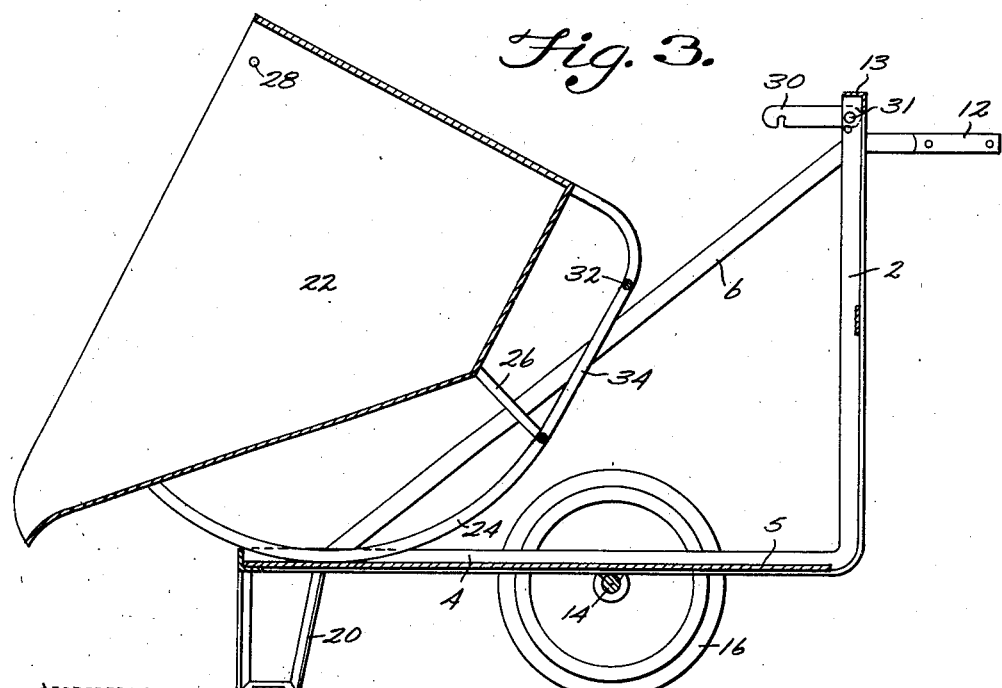
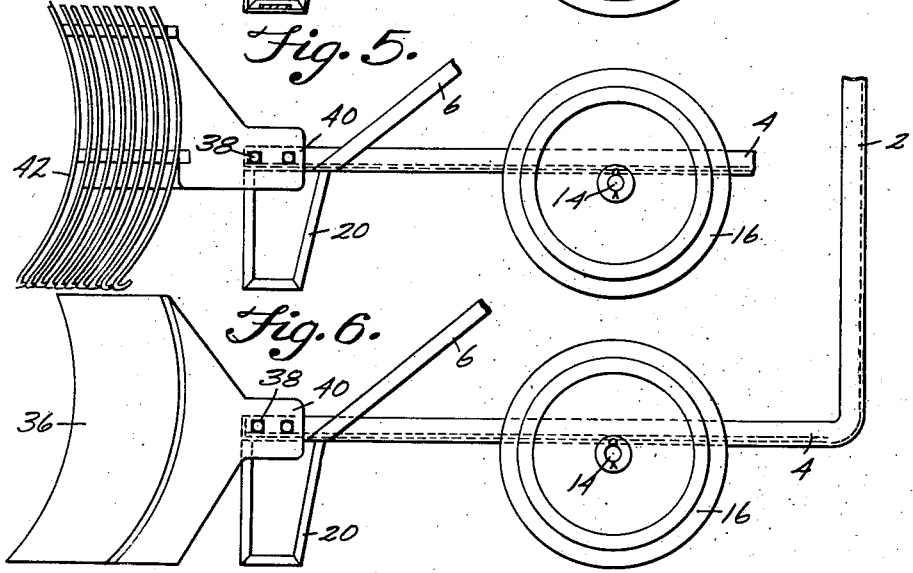
INVENTOR.
Nello Orsini,
BY Victor J. Evans & Co.
ATTORNEYS March 15, 1949. N. ORSINI 2,464,709
PUSHCART Filed Nov. 20, 1946 3 Sheets-Sheet 3

INVENTOR.
Nello Orsini,
BY Victor J. Evans & Co.
ATTORNEYS

Patented Mar. 15, 1949

2,464,709

UNITED STATES PATENT OFFICE 2,464,709

PUSHCART

Nello Orsini, Royal Oak, Mich.

Application November 20, 1946, Serial No. 711,007

1 Claim. (Cl. 298—5)

My present invention relates to an improved push cart and more particularly to a wheeled cart having a dump body, and adapted to have mounted thereon such accessories as a snow plow, lawn rake, or other device.

Generally my invention comprises a metal frame having wheels centered thereunder, and a rockable receptacle which may be dumped and/or detached. Such accessories as are desirable may be bolted or otherwise secured to the front of the frame for use with or without the receptacle.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 3 is a longitudinal vertical sectional view with the receptacle in dumping position.

Figure 5 is a partial side elevational view showing a lawn rake in position.

Figure 6 is a similar view showing a snow plow in position.

Figure 1:
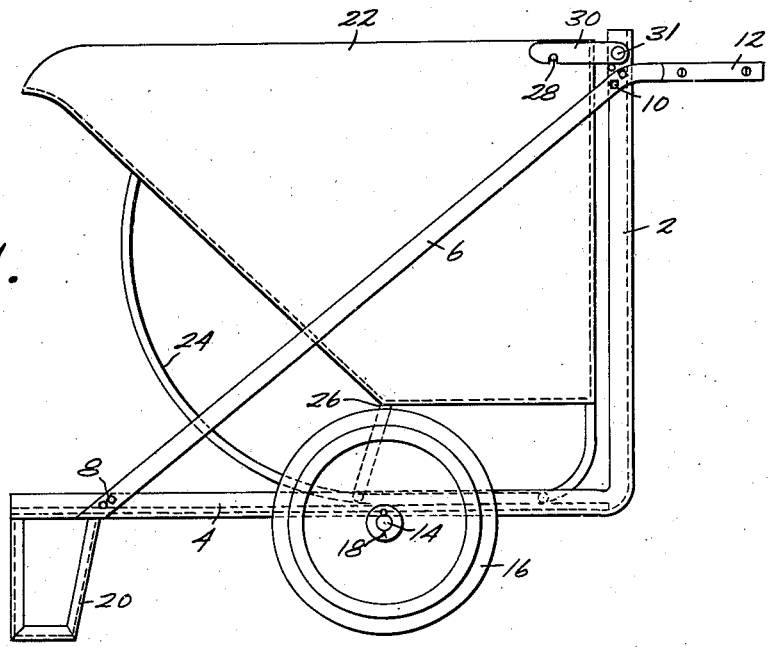
Figure 1 is a side elevational view of the cart of my invention.
Figure 2:
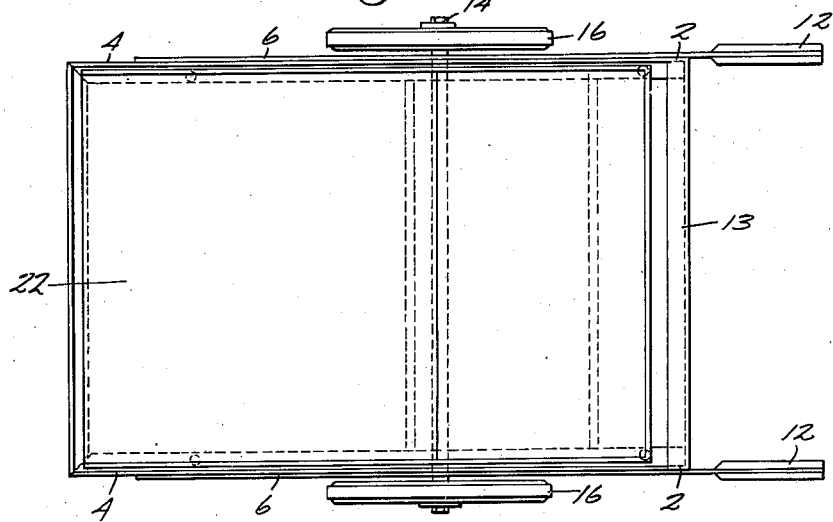
Figure 2 is a top plan view thereof.
Figure 4:
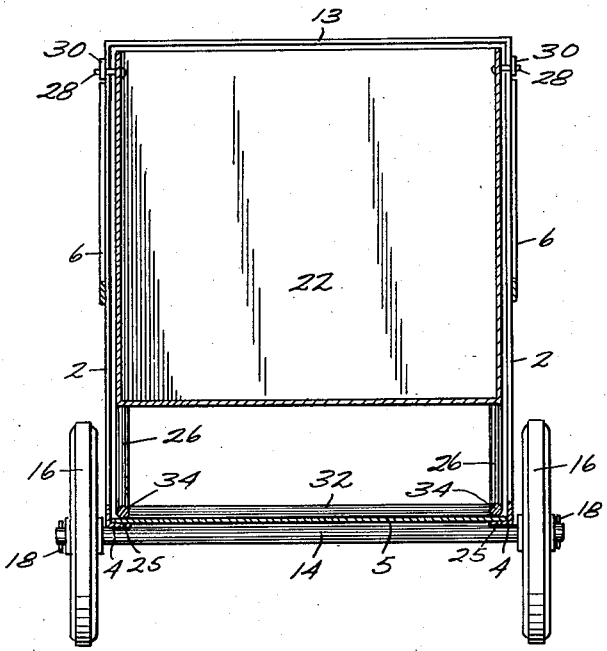
Figure 4 is a vertical transverse section view as seen in Figure 1.
Figure 7:
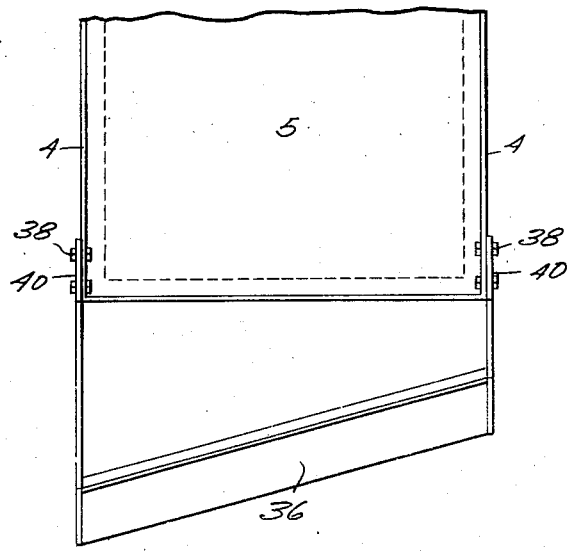
Figure 7 is a partial top plan view showing the snow plow.

Referring now to the drawings wherein like characters indicate like parts, I have illustrated the present preferred embodiment of my invention as comprising the L-shaped frame having uprights 2 and horizontal arms 4 of angle iron and supporting the bottom 5 of sheet metal preferably. Braces 6 are bolted at 8 to the arms and at 10 to the uprights and extend beyond the uprights to form handle 12. Connector 13 positions the upper ends of the uprights in spaced relation.

An axle 14 is suitably secured to the frame and carries wheels 16 positioned thereon by cotter pins 18. A front support 20 maintains the frame in balance when the cart is at rest.

A receptacle 22 is provided with rockers 24 braced at 26 to rest and rock upon the horizontal portions 25 of the angle iron arms 4, and the pins 28 are latched by detents 30 pivotally secured on the uprights 2 at 31.

Tie rods 32 space the rockers 24 and between the rods the rockers are substantially plane or flat at 34 to rest upon the angle iron portions 25 to stabilize the receptacle.

As desired a snow plow 36 may be secured to the arms 4 through bolts 38 in ears 40, and a rake having tines 42 may be alternately so placed. Normally when the plow or rake is used the receptacle is removed, although it may be filled and positioned to add weight to the cart.

Without the plow or rake, and by removing the receptacle the cart may be used to transport various items on the bottom 5 as a balanced wagon.

It will be apparent that the push cart of my invention has many practical uses and may be used around the house or farm, and many other places to accomplish the many purposes by converting the cart to the best structure for a specific use.

Having thus fully described my invention what I claim as new and desire to secure by Letters Patent is:

The combination with an L shaped wheeled vehicle frame of angle iron construction, said frame having spaced parallel uprights and spaced horizontally disposed parallel arms, diagonal braces secured to said uprights and said arms adjacent to the ends thereof, the upper ends of said braces providing a handle for said frame, of a bottom for the frame supported by and within the angle of said arms, a receptacle having rockers supported on the bottom within the arms of the frame, said rockers having a plane portion, pins on opposite side of the receptacle near the upper rear ends thereof, pivoted detents on the frame for detachably securing the pins for latching the receptacle in position on the frame with the plane rocker portion in contact with the bottom, and means for supporting the frame at rest.

NELLO ORSINI.

REFERENCES CITED

The following references are of record in the file of this patent:

UNITED STATES PATENTS

| Number | Name | Date |
|---|---|---|
| 72,133 | Vose | Dec. 10, 1867 |
| 226,649 | Butt | Apr. 20, 1880 |
| 1,180,905 | Carter | Apr. 25, 1916 |
| 1,727,271 | Burns | Sept. 3, 1929 |
| 1,882,307 | Venable | Oct. 11, 1932 |